(12) United States Patent
Sun et al.

(10) Patent No.: US 9,775,113 B2
(45) Date of Patent: Sep. 26, 2017

(54) VOICE WAKEUP DETECTING DEVICE WITH DIGITAL MICROPHONE AND ASSOCIATED METHOD

(71) Applicant: MEDIATEK Inc., Hsin-Chu (TW)

(72) Inventors: Liang-Che Sun, Taipei (TW); Yiou-Wen Cheng, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 14/959,037

(22) Filed: Dec. 4, 2015

(65) Prior Publication Data
US 2016/0171976 A1    Jun. 16, 2016

Related U.S. Application Data

(60) Provisional application No. 62/090,614, filed on Dec. 11, 2014, provisional application No. 62/117,109, filed on Feb. 17, 2015.

(51) Int. Cl.
*G10L 15/22* (2006.01)
*H04W 52/02* (2009.01)
(Continued)

(52) U.S. Cl.
CPC ......... *H04W 52/0251* (2013.01); *G10L 15/22* (2013.01); *G10L 15/28* (2013.01); *G10L 2015/088* (2013.01); *Y02B 60/50* (2013.01)

(58) Field of Classification Search
USPC ................. 704/275, 231–257, 270
See application file for complete search history.

(56) References Cited

U.S. PATENT DOCUMENTS 7,567,827 B2    7/2009  Kim
8,768,712 B1 *  7/2014  Sharifi ............... G10L 15/08
                                                    704/270
(Continued)

FOREIGN PATENT DOCUMENTS

EP          2772907 A1      9/2014
WO   WO 03026158 A1 *      3/2003   ........... H04B 1/0003
WO       2012025784 A1      3/2012

OTHER PUBLICATIONS

EP Extended Search Report dated Apr. 14, 2016 in corresponding application (No. 15196351.9-1901).
(Continued)

*Primary Examiner* — Abul Azad
(74) *Attorney, Agent, or Firm* — McClure, Qualey & Rodack, LLP

(57) ABSTRACT

A voice wakeup detecting device for an electronic product includes a digital microphone and an application processor. The digital microphone has a function of judging whether a digital voice signal contains a subword according to subword model parameters. If the digital microphone confirms that the digital voice signal contains the subword, the digital microphone generates a first interrupt signal and outputs the digital voice signal. The application processor is enabled in response to the first interrupt signal. The application processor judges whether the digital voice signal contains a keyword according to keyword model parameters. If the application processor confirms that the digital voice signal contains the keyword, the electronic product is waked up from a sleep state to a normal working state under control of the application processor.

26 Claims, 8 Drawing Sheets

(51) Int. Cl.
*G10L 15/08* (2006.01)
*G10L 15/28* (2013.01)

(56) References Cited

U.S. PATENT DOCUMENTS

| | | | |
|---|---|---|---|
| 8,928,505 B1* | 1/2015 | Coenen | G06F 1/08 |
| | | | 327/291 |
| 2007/0160234 A1* | 7/2007 | Deruginsky | H02M 3/073 |
| | | | 381/113 |
| 2009/0316035 A1* | 12/2009 | Hirota | H04N 3/1562 |
| | | | 348/311 |
| 2011/0288860 A1* | 11/2011 | Schevciw | G10L 25/78 |
| | | | 704/233 |
| 2013/0322461 A1* | 12/2013 | Poulsen | H04J 3/02 |
| | | | 370/458 |
| 2013/0339028 A1* | 12/2013 | Rosner | G10L 15/222 |
| | | | 704/275 |
| 2014/0136215 A1 | 5/2014 | Dai et al. | |
| 2014/0348345 A1 | 11/2014 | Furst et al. | |
| 2015/0026580 A1 | 1/2015 | Kang et al. | |
| 2015/0043755 A1 | 2/2015 | Furst et al. | |
| 2015/0112690 A1* | 4/2015 | Guha | G06F 1/3203 |
| | | | 704/275 |
| 2015/0154954 A1 | 6/2015 | Sharifi | |

OTHER PUBLICATIONS

Non-Final Office Action issued in U.S. Appl. No. 14/872,207, filed Oct. 1, 2015, mailed Oct. 19, 2016.

* cited by examiner ical to a voice wakeup
VOICE WAKEUP DETECTING DEVICE WITH DIGITAL MICROPHONE AND ASSOCIATED METHOD This application claims the benefits of U.S. provisional application Ser. No. 62/090,614, filed Dec. 11, 2014 and No. 62/117,109, filed Feb. 17, 2015, the subject matters of which are incorporated herein by reference.

FIELD OF THE INVENTION

The invention relates to a detecting device and a control method thereof, and more particularly to a voice wakeup detecting device with a digital microphone and a voice wakeup detecting method.

BACKGROUND OF THE INVENTION

Nowadays, the functions of smart phones are more diversified. For example, the smart phones with a voice wakeup function are favored by most consumers. For example, when the smart phone in a sleep state receives a voice of a keyword from the user, the smart phone starts to recognize the keyword. If the keyword is authenticated, the smart phone is switched from the sleep state to a normal working state. In other words, the user can wake up the smart phone or other electronic products without the need of pressing any function key of the smart phone.

FIG. 1 is a block diagram illustrating a voice wakeup detecting device 100 of an electronic product according to the prior art. The voice wakeup detecting device 100 comprises a front end detecting circuit 110, a speech recognition processor 120 and a main processor 130. The front end detecting circuit 110 comprises a microphone 102 and an event detector 104. In a sleep state, the front end detecting circuit 110 is still powered, and the microphone 102 and the event detector 104 are continuously operated. Generally, the process of waking up the electronic product comprises the following three detection phases.

The event detector 104 performs acoustic event detection. The microphone 102 is an analog microphone for generating a voice signal Sa to the event detector 104. The event detector 104 detects the amplitude, the signal-to-noise ratio (SNR) or the sub-band SNR of the voice signal Sa.

When the electronic product is in the sleep state and the voice wakeup detecting device 100 is in a first detection phase, the microphone 102 continuously receives the ambient voice and converts the ambient voice into the voice signal Sa. The voice signal Sa is transmitted to the event detector 104. If the amplitude of the voice signal Sa is higher than a threshold value, the event detector 104 generates a first interrupt signal INT1 to the speech recognition processor 120.

Alternatively, the event detector 104 may detect the signal-to-noise ratio (SNR) or the sub-band SNR of the voice signal Sa. For example, if the SNR or the sub-band SNR of the voice signal Sa is higher than a threshold value, the event detector 104 generates the first interrupt signal INT1 to the speech recognition processor 120.

An example of the speech recognition processor 120 is a digital signal processor (DSP), which is also referred to a tiny processor. The speech recognition processor 120 performs a speech recognition on the voice signal Sa. If the first interrupt signal INT1 is not asserted, the speech recognition processor 120 is not powered and thus disabled. Meanwhile, the voice wakeup detecting device 100 is in the first detection phase. Whereas, if the first interrupt signal INT1 is asserted, the speech recognition processor 120 is enabled. Consequently, the detection phase of the voice wakeup detecting device 100 is changed from the first detection phase to a second detection phase so as to perform the speech recognition of recognizing the keyword of the voice signal Sa.

In the second detection phase, the speech recognition processor 120 judges whether the voice signal Sa is the voice of the keyword. After the speech recognition processor 120 receives the voice signal Sa and performs an analog-to-digital conversion on the voice signal Sa, the speech recognition processor 120 starts to recognize the keyword. If the speech recognition processor 120 confirms that the voice signal Sa is the voice of the keyword, the speech recognition processor 120 generates a second interrupt signal INT2 to the main processor 130. After the main processor 130 receives the second interrupt signal INT2, the detection phase of the voice wakeup detecting device 100 is changed from the second detection phase to a third detection phase.

Whereas, if the speech recognition processor 120 judges that the voice signal Sa is not the voice of the keyword, the speech recognition processor 120 does not generate the second interrupt signal INT2 to the main processor 130 and the speech recognition processor 120 is disabled again. Meanwhile, the detection phase of the voice wakeup detecting device 100 is changed from the second detection phase to the first detection phase. In the first detection phase, the front end detecting circuit 110 continuously detects whether the first interrupt signal INT1 is asserted.

In the third detection phase, the main processor 130 is enabled and thus the smart phone is in the normal working state.

From the above discussions, the front end detecting circuit 110 of the smart phone in the first detection phase only judges the voice event of the voice signal Sa but does not recognize the keyword of the voice signal Sa. In the second detection phase, the speech recognition processor 120 starts to recognize the keyword of the voice signal Sa.

Since the front end detecting circuit 110 of the voice wakeup detecting device 100 is enabled only in the first detection phase, the power consumption is the lowest (e.g., about 1 mA). Since the front end detecting circuit 110 and the speech recognition processor 120 are both enabled in the second detection phase, the power consumption is increased (e.g., 6 mA).

However, the conventional voice wakeup detecting device 100 still has some drawbacks. For example, in case that the smart phone in the sleep state is placed in a noisy environment, the microphone 102 continuously receives the non-keyword voice. That is, the front end detecting circuit 110 may often assert the first interrupt signal INT1 due to noise trigging. Consequently, the detection phase of the conventional voice wakeup detecting device 100 is often switched between the first detection phase and the second detection phase. In other words, the use power consumption in a day is very huge.

SUMMARY OF THE INVENTION

The invention provides a voice wakeup detecting device and a voice wakeup detecting method for an electronic product. The voice wakeup detecting device comprises a digital microphone. When the electronic product is in a sleep state, the voice wakeup detecting device can recognize the voice signal more accurately in the first detection phase.

The invention provides a voice wakeup detecting device for an electronic product. The voice wakeup detecting device comprises: a digital microphone, for controlling a first interrupt signal by judging whether a digital voice signal contains a subword; and an application processor, selectively enabled in response to the first interrupt signal, for controlling a second interrupt signal by judging whether the digital voice signal contains a keyword, wherein if the application processor confirms that the digital voice signal contains the keyword, the electronic product is waked up from a sleep state to a normal working state under control of the application processor.

The invention further provides a digital microphone for an electronic product. A digital microphone comprises: an internal oscillator for generating a clock signal; an analog-to-digital converter for converting an analog speech sound into a digital voice signal; a subword judging circuit for judging whether the digital voice signal contains the subword according to subword model parameters, wherein if the subword judging circuit confirms that the digital voice signal contains the subword, the subword judging circuit asserts a first interrupt signal; a first-in-first-out buffer, wherein when the first interrupt signal is asserted, the digital voice signal is temporarily stored in the first-in-first-out buffer; and a first interface control module outputting the first interrupt signal and the digital voice signal to an application processor of the electronic product, wherein the analog-to-digital converter, the subword judging circuit, the first-in-first-out buffer and the first interface control module are operated according to the clock signal.

The invention further provides a voice wakeup detecting method for an electronic product. The voice wakeup detecting method comprises steps of: when the electronic product is in a sleep state, allowing a digital microphone to generates a digital voice signal; if the digital voice signal contains a voice of a subword confirmed by the digital microphone, enabling an application processor to recognize the digital voice signal; and if the digital voice signal contains a voice of a keyword confirmed by the application processor, waking up the electronic product from the sleep state to a normal working state.

Numerous objects, features and advantages of the invention will be readily apparent upon a reading of the following detailed description of embodiments of the invention when taken in conjunction with the accompanying drawings. However, the drawings employed herein are for the purpose of descriptions and should not be regarded as limiting.

BRIEF DESCRIPTION OF THE DRAWINGS

The above objects and advantages of the invention will become more readily apparent to those ordinarily skilled in the art after reviewing the following detailed description and accompanying drawings, in which.

DETAILED DESCRIPTION OF PREFERRED EMBODIMENTS

The invention provides a speaker-dependent voice wakeup detecting device and a control method thereof. In accordance with the invention, a training action is performed to create subword model parameters and keyword model parameters. The subword model parameters and the keyword model parameters are applied to a first detection phase and a second detection phase, respectively.

Figure 1:
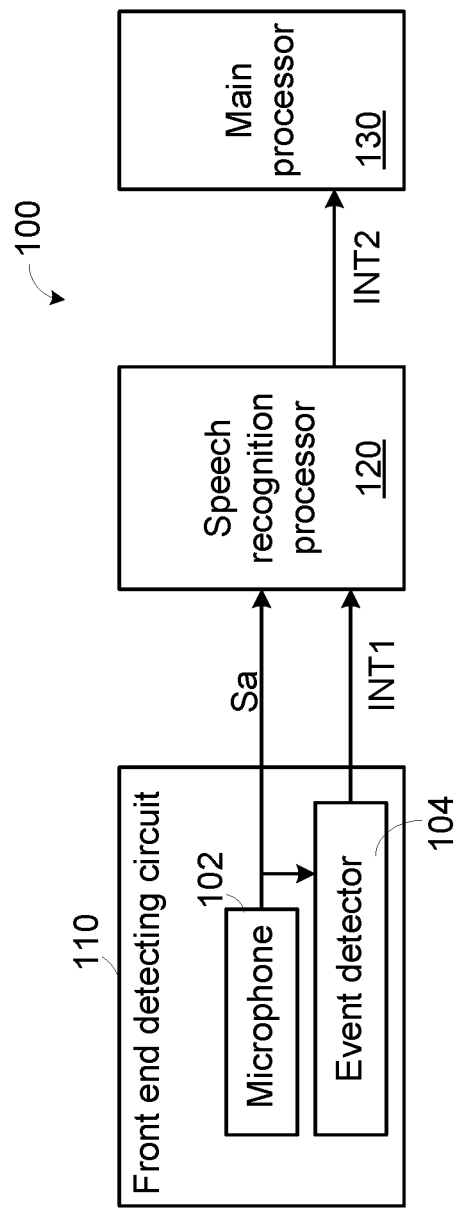
FIG. 1 (prior art) is a block diagram illustrating a voice wakeup detecting device of an electronic product according to the prior art.
Figure 2A:
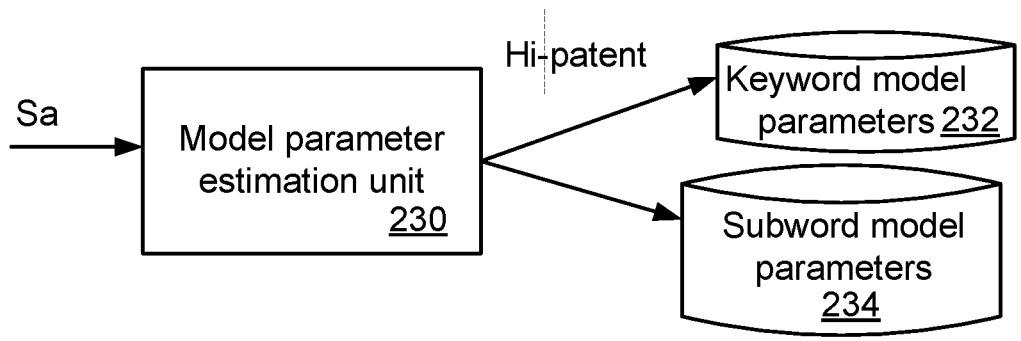
FIGS. 2A and 2B are block diagrams illustrating a voice wakeup detecting device of an electronic product in the normal working state and in the sleep state according to an embodiment of the invention.
Figure 2B:
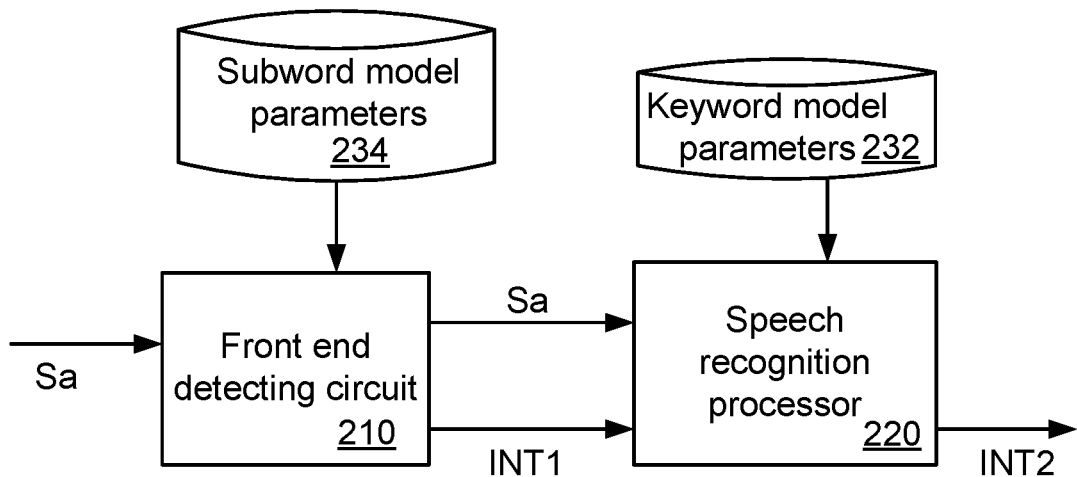

FIGS. 2A and 2B are block diagrams illustrating the implementation concept of a voice wakeup detecting device of an electronic product according to an embodiment of the invention. The voice wakeup detecting device comprises a front end detecting circuit 210, a speech recognition processor 220 and a main processor (not shown). When the electronic product is in a normal working state, the main processor can be used to generate keyword model parameters 232 and subword model parameters 234. When the electronic product is in a sleep state, the subword model parameters are applied to the first detection phase, and the keyword model parameters are applied to the second detection phase.

As shown in FIG. 2A, when the electronic product is in the normal working state, the main processor can be activated to perform the training action to receive a voice signal Sa of the keyword. The following embodiments will be illustrated by taking the keyword "Hi-Patent" and the subword "Hi" as examples.

During the process of performing the training action, a model parameter estimation unit 230 of the main processor firstly receives the voice signal Sa corresponding to the keyword "Hi-Patent" from the user, and then the model parameter estimation unit 230 performs a feature extracting action to extract voice features of the voice signal Sa. For example, the voice features includes frequency, sound volume, noise . . . etc. Then, the model parameter estimation unit 230 creates the keyword model parameters 232 of the voice signal Sa according to a specified speech recognition model. For example, the specified speech recognition model is a hidden Markov model (abbreviated HMM). It is noted that the example of the specified speech recognition model is not restricted. Another example of the specified speech recognition model includes but is not limited to a Gaussian mixture model (abbreviated GMM), a support vector machine (SVM) or a neural net model.

For creating the subword model parameters 234, the model parameter estimation unit 230 performs a segmenting operation on the keyword "Hi-Patent". The segmenting operation is based on the HMM of the keyword "Hi-Patent" by applying a Viterbi decoding algorithm to separate "Hi" and "Patent" of the keyword "Hi-Patent".

After the segmenting operation is completed, the model parameter estimation unit 230 acquires the subword "Hi" and thus creates the subword model parameters 234 according to HMM. It is noted that the segmenting operation is not restricted to separate the keyword "Hi-Patent" into "Hi" and "Patent". Alternatively, the keyword "Hi-Patent" is separated into "Hi, Pa" and "tent" after the segmenting operation is completed.

As shown in FIG. 2B, when the electronic product is in the sleep state and the voice wakeup detecting device is in the first detection phase, the front end detecting circuit 210 judges whether the voice signal Sa contains the voice of the subword "Hi" according to the subword model parameters 234. If the front end detecting circuit 210 confirms that the voice signal Sa contains the voice of the subword "Hi", the front end detecting circuit 210 generates a first interrupt signal INT1 to the speech recognition processor 220.

An example of the speech recognition processor 220 is a digital signal processor (DSP), which is also referred to a tiny processor. The speech recognition processor 220 performs a speech recognition on the voice signal Sa. If the first interrupt signal INT1 is not asserted, the speech recognition processor 220 is not powered and thus disabled. Meanwhile, the voice wakeup detecting device is in the first detection phase. Whereas, if the first interrupt signal INT1 is asserted, the speech recognition processor 220 is enabled. Consequently, the detection phase of the voice wakeup detecting device is changed from the first detection phase to a second detection phase.

In the second detection phase, the speech recognition processor 220 judges whether the voice signal Sa is the voice of the keyword "Hi-Patent" according to the keyword model parameters 232. If the speech recognition processor 220 confirms that the voice signal Sa is the voice of the keyword "Hi-Patent", the speech recognition processor 220 asserts a second interrupt signal INT2 to the main processor. After the main processor receives the second interrupt signal INT2, the detection phase of the voice wakeup detecting device is changed from the second detection phase to a third detection phase.

Whereas, if the speech recognition processor 220 judges that the voice signal Sa is not the voice of the keyword "Hi-Patent", the speech recognition processor 220 does not assert the second interrupt signal INT2 to the main processor and the speech recognition processor 220 is disabled again. Meanwhile, the detection phase of the voice wakeup detecting device is changed from the second detection phase to the first detection phase. In the first detection phase, the front end detecting circuit 210 continuously detects whether the first interrupt signal INT1 is generated.

From the above descriptions, the subword of the voice signal Sa is firstly recognized in the first detection phase. Consequently, the number of times that the voice wakeup detecting device performs the keyword recognition process is effectively reduced. In other words, the use power consumption in a day is reduced.

Figure 3:
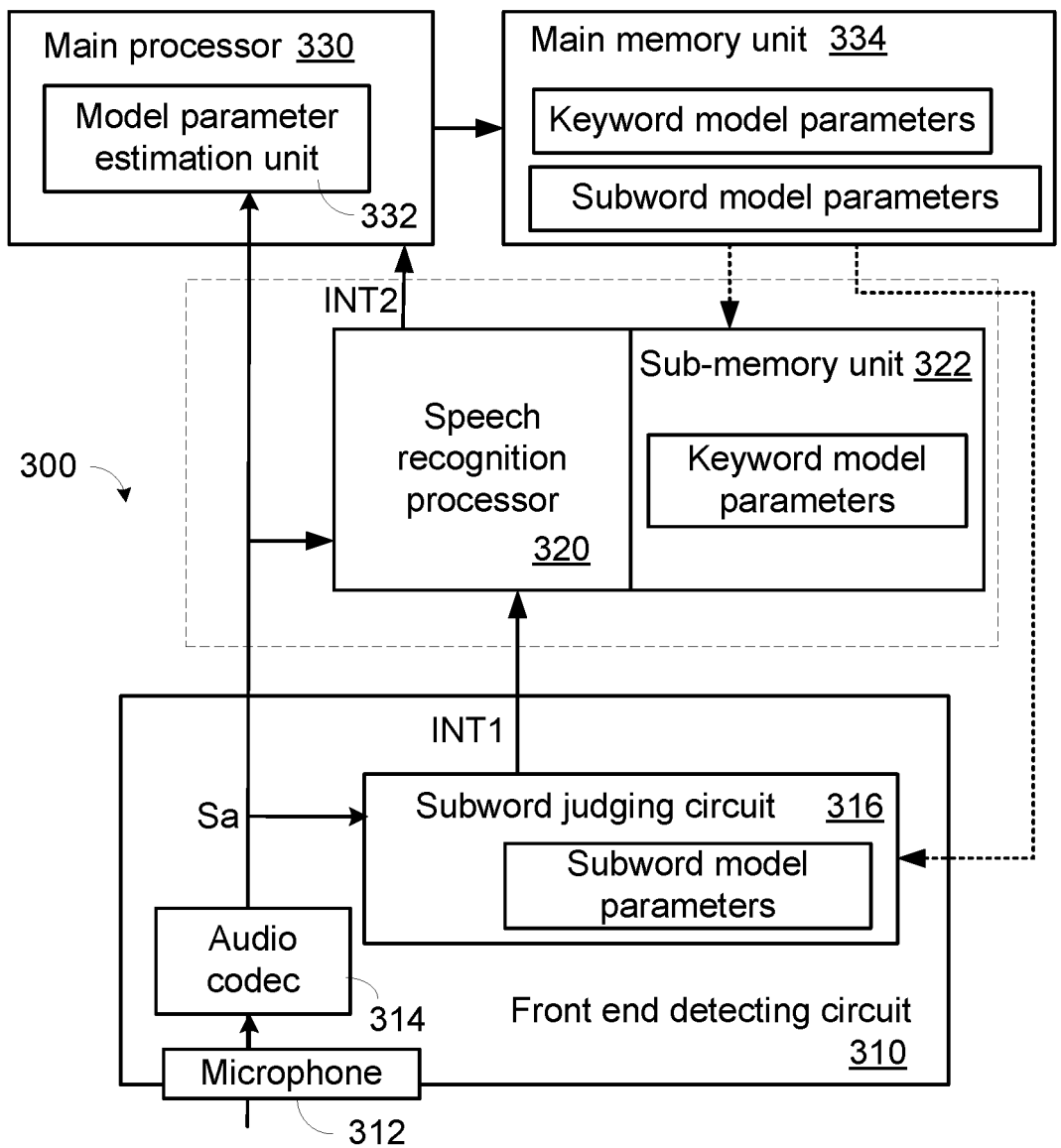
FIG. 3 is a block diagram illustrating a voice wakeup detecting device of the electronic product according to a first embodiment of the invention.

FIG. 3 is a block diagram illustrating a voice wakeup detecting device of the electronic product according to a first embodiment of the invention. The voice wakeup detecting device 300 comprises a front end detecting circuit 310, a speech recognition processor 320 and a main processor 330. The front end detecting circuit 310 comprises a microphone 312, an audio codec 314 and a subword judging circuit 316. The microphone 312 generates an analog voice signal to the audio codec 314. By the audio codec 314, an analog voice signal from the microphone 312 is converted into a digital voice signal Sa.

The main processor 330 is connected with a main memory unit 334. The speech recognition processor 320 is connected with a sub-memory unit 322. The subword judging circuit 316 has an embedded memory (not shown). It is noted that the relationships between these components and the corresponding memory units are not restricted. For example, in another embodiment, the main memory unit 334 is an embedded memory of the main processor 330, the sub-memory unit 322 is an embedded memory of the speech recognition processor 320, and the subword judging circuit 316 is connected with an external memory unit.

When the electronic product is in a normal working state, the user may operate the main processor 330 to perform a training action. During the process of performing the training action, a model parameter estimation unit 332 of the main processor 330 firstly receives the voice signal Sa corresponding to the keyword "Hi-Patent" from the user, and then the model parameter estimation unit 332 creates keyword model parameters and subword model parameters of the voice signal Sa according to an HMM model. After the training action is completed, the keyword model parameters and the subword model parameters are stored into the main memory unit 334. For example, the main memory unit 334 is a non-volatile memory.

When the electronic product is about to be in a sleep state, the keyword model parameters and the subword model parameters are read out from the main memory unit 334, and the keyword model parameters and the subword model parameters are respectively stored into the sub-memory unit 322 and the embedded memory of the subword judging circuit 316.

When the electronic product is in the sleep state, the front end detecting circuit 310 is powered. Consequently, the microphone 312, the audio codec 314 and the subword judging circuit 316 are continuously enabled. In an embodiment, the process of waking up the electronic product from the sleep state comprises the following three detection phases.

In the sleep state, the front end detecting circuit 310 is in a first detection phase to judge whether the voice signal Sa contains the voice of the subword "Hi" according to the subword model parameters. If the front end detecting circuit 310 confirms that the voice signal Sa contains the voice of the subword "Hi", the front end detecting circuit 310 generates a first interrupt signal INT1 to the speech recognition processor 320.

That is, in the first detection phase, the subword judging circuit 316 judges whether the voice signal Sa contains the voice of the subword "Hi" according to the subword model parameters. If the subword judging circuit 316 confirms that the voice signal Sa contains the voice of the subword "Hi", the subword judging circuit 316 generates the first interrupt signal INT1 to the speech recognition processor 320. In response to the first interrupt signal INT1, the speech recognition processor 320 enters a second detection phase. Whereas, if the subword judging circuit 316 judges that the voice signal Sa does not contain the voice of the subword "Hi", the front end detecting circuit 310 is maintained in the first detection phase.

An example of the speech recognition processor 320 is a digital signal processor (DSP), which is also referred to a tiny processor. The speech recognition processor 320 performs a speech recognition on the voice signal Sa. If the first interrupt signal INT1 is not asserted, the speech recognition processor 320 is not powered and thus disabled. Meanwhile, the voice wakeup detecting device is in the first detection phase. Whereas, if the first interrupt signal INT1 is asserted, the speech recognition processor 320 is enabled. Consequently, the detection phase of the voice wakeup detecting device is changed from the first detection phase to the second detection phase.

In the second detection phase, the speech recognition processor 320 directly receives the digital voice signal Sa and recognizes the digital voice signal Sa. Meanwhile, the speech recognition processor 320 judges whether the voice signal Sa is the voice of the keyword "Hi-Patent" according to the keyword model parameters. If the speech recognition processor 320 confirms that the voice signal Sa is the voice of the keyword "Hi-Patent", the speech recognition processor 320 asserts a second interrupt signal INT2 to the main processor 330. After the main processor 330 receives the second interrupt signal INT2, the detection phase of the voice wakeup detecting device is changed from the second detection phase to a third detection phase.

Whereas, if the speech recognition processor 320 judges that the voice signal Sa is not the voice of the keyword "Hi-Patent", the speech recognition processor 320 does not assert the second interrupt signal INT2 to the main processor 330 and the speech recognition processor 320 is disabled again. Meanwhile, the detection phase of the voice wakeup detecting device is changed from the second detection phase to the first detection phase. In the first detection phase, the front end detecting circuit 310 continuously detects whether the first interrupt signal INT1 is generated.

In the third detection phase, the main processor 330 is enabled and thus the electronic product is in the normal working state.

In this embodiment, when the electronic product is about to be in the sleep state, the keyword model parameters and the subword model parameters are read out from the main memory unit 334, and the keyword model parameters and the subword model parameters are respectively stored into the sub-memory unit 322 and the embedded memory of the subword judging circuit 316. Moreover, the speech recognition processor 320 may modify the subword model parameters according to the environmental factors. For example, the speech recognition processor 320 may acquire the signal-to-noise ratio (SNR), the noise type or other factors of the environment from the voice signal Sa. Consequently, the subword model parameters are modified into modified subword model parameters by the speech recognition processor 320. Then, the modified subword model parameters are transmitted to the subword judging circuit 316.

In other word, after the subword model parameters are modified into modified subword model parameters by the speech recognition processor 320, the modified subword model parameters are stored into the subword judging circuit 316. Consequently, the recognition rate of the subword in the first detection phase is enhanced.

Figure 4A:
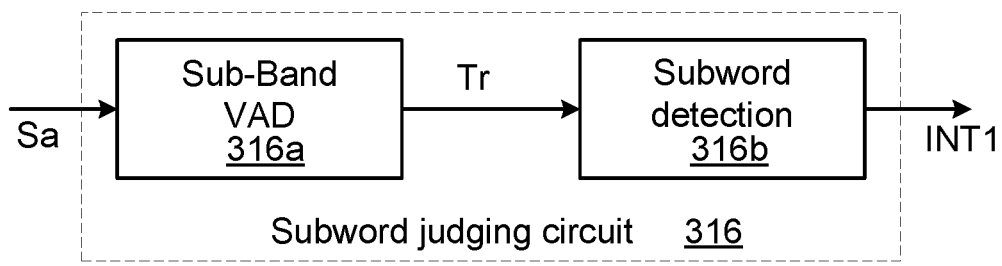
FIGS. 4A, 4B and 4C schematically illustrate the subword judging circuit of the voice wakeup detecting device according to the first embodiment of the invention.
Figure 4B:
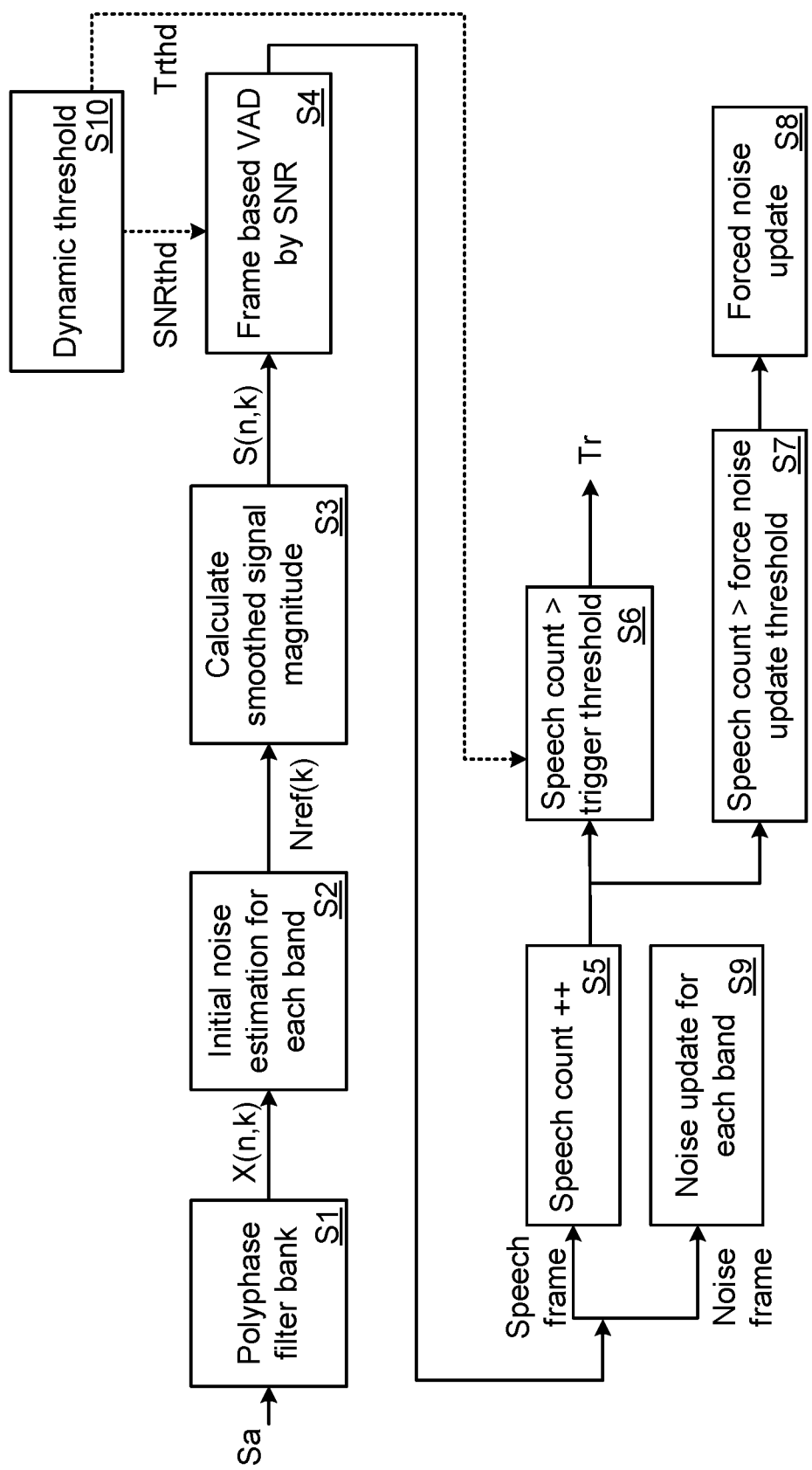
Figure 4C:
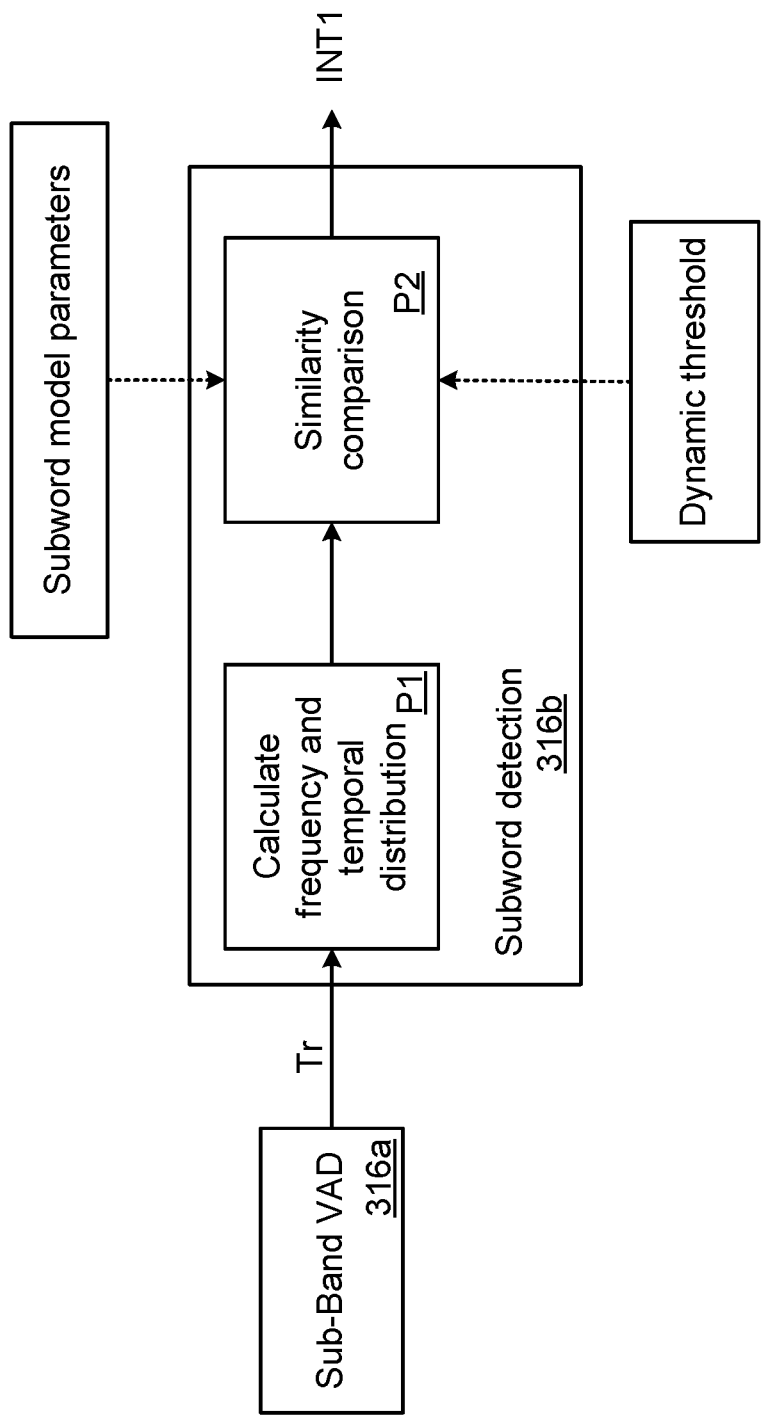

FIGS. 4A, 4B and 4C schematically illustrate the subword judging circuit of the voice wakeup detecting device according to the first embodiment of the invention. The processes of the subword judging circuit 316 comprise two stages. As shown in FIG. 4A, the first stage is the sub-band voice activity detection (VAD) stage 316a and the second stage is the subword detection stage 316b.

In the sub-band voice activity detection (VAD) stage 316a, for example, a 256 ms audio buffer and 10 sub-bands are provided. For example, the 0~6 KHz frequency band is divided to 10-bands. When the VAD result indicates the voice signal Sa containing voice, such as human voice, a trigger signal Tr is issued to activate the subword detection stage 316b.

In the subword detection stage 316b, subword model parameters from the training action are applied to check if the speech frames in the voice signal Sa are matched to the subword "Hi" according to the subword model parameters. If the subword detection stage 316b confirms that the voice signal Sa contains the voice of the subword "Hi", the subword detection stage 316b generates the first interrupt signal INT1.

FIG. 4B shows a sub-band VAD framework applied to the sub-band voice activity detection (VAD) stage 316a. According to the embodiment of the invention, noise and speech levels in the detection (VAD) stage 316a are continuously updated. In S1, polyphase filter bank, such as QMF filter bank, is adopted to detect the voice signal Sa and then generate output values X(n.k). The output values X(n.k) of the polyphase filter bank are defined to indicate the value at frame index n and sub-band index k.

In S2, the initial noise reference values Nref(k) for each band is defined according to the output values X(n.k). In S3, the smoothed signal S(n,k) is calculated according to the initial noise reference values Nref(k).

After the initial noise reference values Nref(k) and the smoothed signal S(n,k) are obtained, an SNR value of k-th bank of n-th frame is obtained [SNR(n,k)=S(n,k)−Nref(k)] by a frame-based VAD by SNR in S4. And then, an average SNR value ASNR(n) is calculated according to the initial noise reference values Nref(k) and an SNR threshold SNRthd, which is dynamically updated in S10. In S4, a VAD of n-th frame is defined as VAD(n)=1, if ASNR(n)>the SNR threshold SNRthd; and VAD of n-th frame is defined as VAD(n)=0, if ASNR(n)<the SNR threshold SNRthd.

In S5 of the speech frame path, a Speech count is increased by one if VAD(n)=1, and the a Speech count is cleared to zero if VAD(n)=0. If the Speech count is greater than a trigger threshold Trthd, the trigger signal is issued to the subword detection stage 316b in S6. Furthermore, If the Speech count is greater than a force noise update threshold, the noise reference values Nref(k) should be forced to update in S7 and S8.

In S9 of the noise frame path, when VAD(n)=0, the noise reference value noise values for each band Nref(k) should be updated.

According to the embodiment of the invention, SNR threshold SNRthd and trigger threshold Trthd should be adapted based on the environment noise level. For example, the SNR threshold SNRthd and trigger threshold Trthd are set lower in the high noise level environment.

FIG. 4C shows a subword detection framework applied to the subword detection stage 316b. In P1, when the subword detection stage 316b is activated by the trigger signal Tr at frame index n, two vectors related to a frequency distribution and a temporal distribution are calculated.

In P2, cosine similarity of the two vectors to obtain the similarity in time and frequency. Also, the calculated time and frequency information will compare with a frequency threshold fthd and a time threshold tthd provided by the dynamic threshold, which is adapted based on different noise and SNR values.

Figure 5:
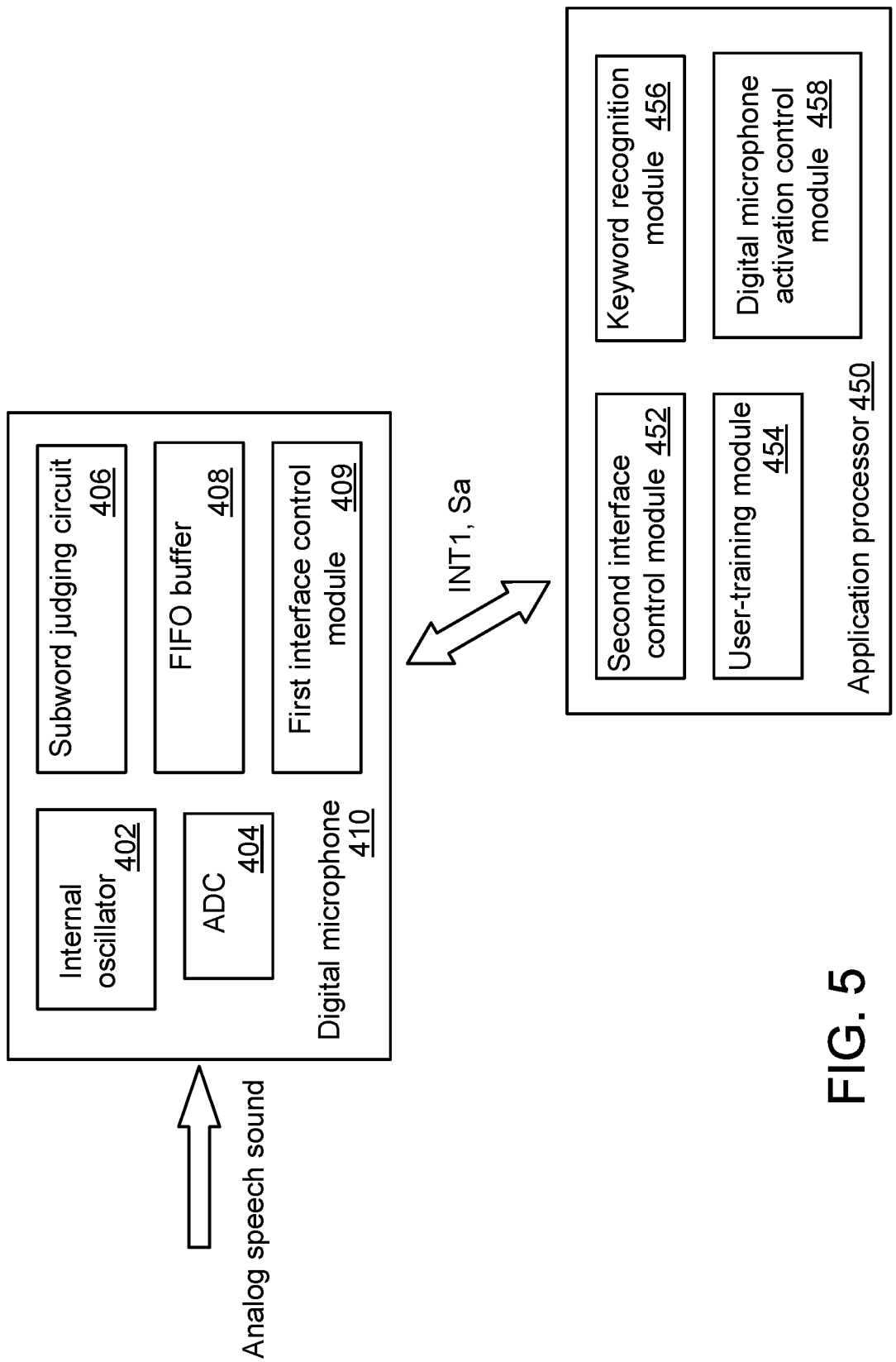
FIG. 5 is a block diagram illustrating a voice wakeup detecting device of the electronic product according to a second embodiment of the invention.

FIG. 5 is a block diagram illustrating a voice wakeup detecting device of the electronic product according to a second embodiment of the invention. In this embodiment, a digital microphone replaces the front end detecting circuit, and the main processor and the speech recognition processor of the first embodiment are integrated into an application processor.

The voice wakeup detecting device 400 of the electronic product comprises a digital microphone 410 and an application processor 450. The digital microphone 410 comprises an internal oscillator 402, an analog-to-digital converter (ADC) 404, a subword judging circuit 406, a first-in-first-out buffer (FIFO buffer) 408 and a first interface control module 409.

The internal oscillator 402 of the digital microphone 410 provides a clock signal to all circuits of the digital microphone 410. Since the clock signal is provided by the internal oscillator 402 of the digital microphone 410, the digital microphone 410 does not need to receive the external clock signal. Consequently, the power consumption of the electronic product is effectively reduced. Moreover, the analog-to-digital converter 404 converts an analog speech sound into a digital voice signal Sa. The first-in-first-out buffer 408 temporarily stores the digital voice signal Sa and transmitting the digital voice signal Sa to the application processor 450.

The subword judging circuit 406 judges whether the digital voice signal Sa contains the voice of the subword. Like the first embodiment, the subword judging circuit 406 has an embedded memory. The subword model parameters from the application processor 450 are stored in the embedded memory of the subword judging circuit 406. If the subword judging circuit 406 confirms that the digital voice signal Sa contains the voice of the subword, the subword judging circuit 406 generates a first interrupt signal INT1 to the application processor 450.

Moreover, the first interface control module 409 is in communication with the application processor 450 for controlling interface transmission of the digital microphone 410.

In this embodiment, the application processor 450 comprises a second interface control module 452, a user-training module 454, a keyword recognition module 456 and a digital microphone activation control module 458.

According to the working state of the electronic product, the digital microphone activation control module 458 selectively enables or disables the digital microphone 410. For example, when the electronic product is in the normal working state, the subword judging circuit 406 of the digital microphone 410 is disabled by the digital microphone activation control module 458. Whereas, when the electronic product is in the sleep state, all circuits of the digital microphone 410 are enabled by the digital microphone activation control module 458.

When the electronic product is in the normal working state, the user may operate the user-training module 454 to perform a training action. During the process of performing the training action, a model parameter estimation unit (not shown) of the user-training module 454 firstly receives the digital voice signal Sa corresponding to the keyword from the user, and then the model parameter estimation unit creates keyword model parameters and subword model parameters of the digital voice signal Sa according to an HMM model. After the training action is completed, the keyword model parameters and the subword model parameters are stored into the memory unit (not shown) of the user-training module 454.

When the electronic product is in the sleep state, the keyword recognition module 456 is enabled in response to the first interrupt signal INT1. In particular, if the application processor 450 receives the first interrupt signal INT1 when the electronic product is in the sleep state, the keyword recognition module 456 is enabled. Meanwhile, the keyword recognition module 456 starts to receive the digital voice signal Sa and recognizes whether the digital voice signal Sa contains the voice of the keyword according to the keyword model parameters.

The second interface control module 452 is in communication with the digital microphone 410 for controlling interface transmission of the application processor 450.

Generally, the signals from the digital microphone 410 and the application processor 450 can be exchanged between the first interface control module 409 and the second interface control module 452. For example, the subword model parameters can be transmitted from the second interface control module 452 of the application processor 450 to the first interface control module 409 of the digital microphone 410, and stored into the embedded memory (not shown) of the subword judging circuit 406. Moreover, the first interrupt signal INT1 can be transmitted from the first interface control module 409 of the digital microphone 410 to the second interface control module 452 of the application processor 450.

From the above descriptions, when the electronic product is in the normal working state, the user may operate the user-training module 454 to perform the training action. After the training action is completed, the keyword model parameters and the subword model parameters are stored in the user-training module 454.

When the electronic product is about to be in a sleep state, the subword model parameters are transmitted from the application processor 450 to the digital microphone 410. Moreover, after the digital microphone 410 is enabled by the digital microphone activation control module 458, the electronic product enters the sleep state.

After the electronic product is in the sleep state, the subword judging circuit 406 of the enabled digital microphone 410 continuously judges whether the digital voice signal Sa contains the voice of the subword.

In other words, when the electronic product is in the sleep state, the digital microphone 410 judges whether the digital voice signal Sa contains the voice of the subword according to the subword model parameters. If the digital microphone 410 confirms that the digital voice signal Sa contains the voice of the subword, the digital microphone 410 generates the first interrupt signal INT1 to the application processor 450. Whereas, if the digital microphone 410 judges that the digital voice signal Sa does not contain the voice of the subword, the digital microphone 410 does not generate the first interrupt signal INT1 to the application processor 450.

Moreover, when the first interrupt signal INT1 is activated, the first-in-first-out buffer 408 of the digital microphone 410 starts outputting the digital voice signal Sa. In other words, if the first interrupt signal INT1 is not activated, the first-in-first-out buffer 408 of the digital microphone 410 is in an idle state. In the idle state, the digital voice signal Sa is not outputted from the first-in-first-out buffer 408.

Moreover, in response to the first interrupt signal INT1, the application processor 450 is enabled. Meanwhile, the keyword recognition module 456 receives the digital voice signal Sa and judges whether the digital voice signal Sa contains the voice of the keyword according to the keyword model parameters. If the keyword recognition module 456 confirms that the digital voice signal Sa contains the voice of the keyword, the electronic product enters the normal working state.

Whereas, if the keyword recognition module 456 judges that the digital voice signal Sa does not contain the voice of the keyword, the application processor 450 is disabled. Meanwhile, the application processor 450 continuously detects whether the first interrupt signal INT1 is outputted from the digital microphone 410.

Moreover, when the first interrupt signal INT1 is generated, the first-in-first-out buffer 408 continuously receives the digital voice signal Sa. In addition, the digital voice signal Sa is transmitted to the keyword recognition module 456 at a specified data rate in order to be recognized by the keyword recognition module 456. In this embodiment, all modules of the voice wakeup detecting device can be implemented by using hardware circuits or using firmware and hardware circuits.

Figure 6A:
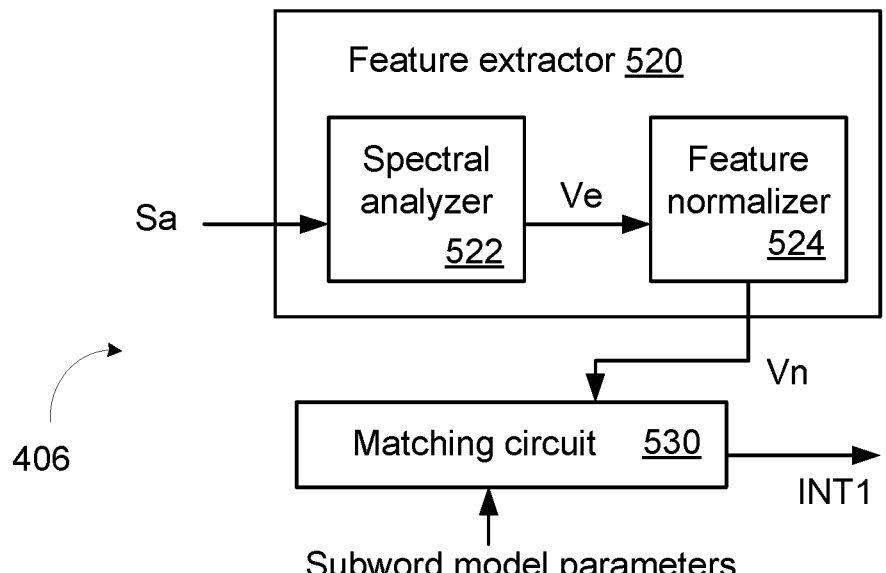
FIGS. 6A and 6B schematically illustrate the subword judging circuit of the voice wakeup detecting device according to the second embodiment of the invention.
Figure 6B:
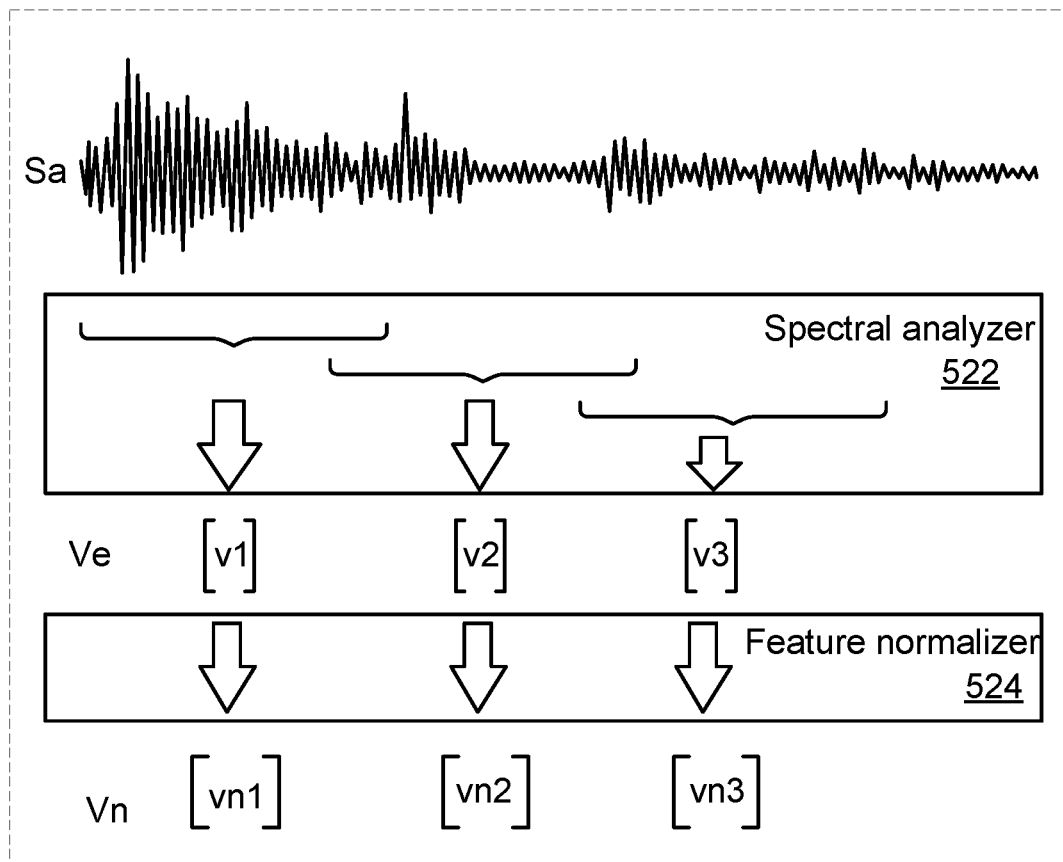

FIGS. 6A and 6B schematically illustrate the subword judging circuit of the voice wakeup detecting device according to the second embodiment of the invention.

As shown in FIG. 6A, the subword judging circuit 406 comprises a feature extractor 520 and a matching circuit 530. The feature extractor 520 comprises a spectral analyzer 522 and a feature normalizer 524.

During operation of the subword judging circuit 406, the spectral analyzer 522 extracts the information of the voice signal Sa and converts the information of the voice signal Sa into a voice feature signal Ve. The voice feature signal Ve denotes the voice feature of the voice signal Sa. Then, the feature normalizer 524 normalizes the voice feature signal Ve into a normalized voice feature signal Vn. The normalized voice feature signal Vn is transmitted to the matching circuit 530.

The matching circuit 530 judges whether the normalized voice feature signal Vn contains the voice of the subword "Hi" according to the subword model parameters, which have been previously stored in the memory. If the matching circuit 530 determines that the normalized voice feature signal Vn contains the voice of the subword "Hi", the matching circuit 530 generates the first interrupt signal INT1. Whereas, if the matching circuit 530 judges that the normalized voice feature signal Vn does not contain the voice of the subword "Hi", the matching circuit 530 does not generate the first interrupt signal INT1.

Generally, the matching circuit 530 judges whether the normalized voice feature signal Vn contains the voice of the subword "Hi" by a matching algorithm. For example, the matching algorithm is a dynamic matching algorithm or a Viterbi decoding algorithm, but is not limited thereto.

As shown in FIG. 6B, the spectral analyzer 522 employs a sub-band analysis technology to extract the information of the voice signal Sa and thus produces plural vectors v1, v2 and v3. These vectors v1, v2 and v3 constitute the voice feature signal Ve.

Then, the feature normalizer 524 normalizes the sound volume, the channel effect and the noise environment of the vectors v1, v2 and v3 into the normalized vectors vn1, vn2 and vn3. These vectors vn1, vn2 and vn3 constitute the normalized voice feature signal Vn.

The matching circuit 530 judges whether the normalized voice feature signal Vn contains the voice of the subword "Hi" by a matching algorithm utilizing the normalized voice feature signal Vn and the previously stored subword model parameters.

Figure 7:
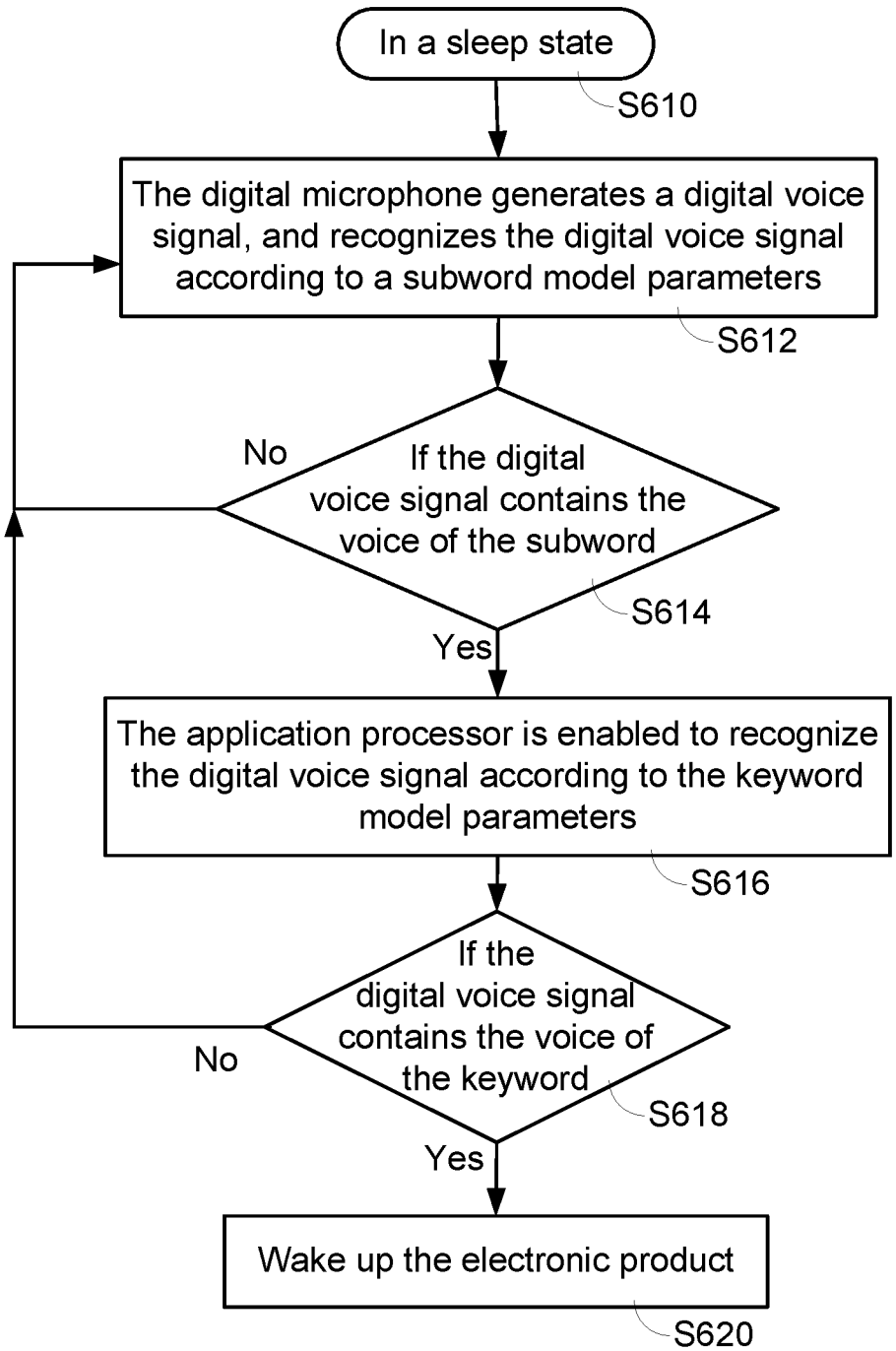
FIG. 7 is a flowchart illustrating a voice wakeup detecting method for an electronic product according to an embodiment of the invention.

FIG. 7 is a flowchart illustrating a voice wakeup detecting method for an electronic product according to an embodiment of the invention. When the electronic product is in a sleep state (Step S610), the digital microphone receives an analog speech sound and converts the analog speech sound into a digital voice signal, and recognizes the digital voice signal according to a subword model parameters (Step S612). Then, the step S614 is performed to judge whether the digital voice signal contains the voice of the subword. If the digital voice signal does not contain the voice of the subword in the step S614, the step S612 is repeatedly done.

If the digital voice signal contains the voice of the subword in the step S614, the application processor is enabled to recognize the digital voice signal according to the keyword model parameters (Step S616).

Then, a step S618 is performed to judge whether the digital voice signal contains the voice of the keyword. If the digital voice signal does not contain the voice of the keyword in the step S618, the step S612 is repeatedly done.

If the voice signal contains the voice of the keyword in the step S618, the electronic product is waked up (Step S620). After the electronic product is waked up, the electronic product is in the normal working state.

In the above embodiments, the user may perform a training action to provide a voice of a keyword to the electronic product when the electronic product is in the normal working state. After the main processor or the application processor receives the voice signal of the keyword from the user, keyword model parameters and subword model parameters are created.

Before the electronic product enters the sleep state, the subword model parameters are transmitted to the digital microphone for facilitating the subword judging circuit to recognize the subword, and the keyword model parameters are stored in the keyword recognition module. Consequently, when the electronic product is in the sleep state, the voice wakeup detecting method of FIG. 6 is performed.

From the above descriptions, the invention provides a voice wakeup detecting device and a voice wakeup detecting method. When the electronic product is in the sleep state, the subword of the digital voice signal Sa is recognized. If the voice wakeup detecting device confirms that the digital voice signal Sa contains the voice of the subword, the voice wakeup detecting device recognizes the keyword. Consequently, the number of times that the voice wakeup detecting device performs the keyword recognition process is effectively reduced. In other words, the use power consumption in a day is reduced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A voice wakeup detecting device for an electronic product, the voice wakeup detecting device comprising:
a digital microphone, for controlling a first interrupt signal by judging whether a digital voice signal contains a subword, wherein if the digital microphone confirms that the digital voice signal contains the subword, the digital microphone asserts the first interrupt signal;
a speech recognition processor connected to the digital microphone, wherein the speech recognition receives the digital voice signal when the first interrupt signal is asserted; and
a main processor connected to the speech recognition processor;
wherein when the first interrupt signal is not asserted, the digital microphone is powered, the speech recognition processor is not powered and the main processor is in a sleep state;
wherein when the first interrupt signal is asserted, the digital microphone and the speech recognition processor are powered and the main processor is in the sleep state; and
wherein the speech recognition processor selectively asserts a second interrupt signal by judging whether the digital voice signal contains a keyword, wherein if the speech recognition processor confirms that the digital voice signal contains the keyword, the main processor is waked up from the sleep state to a normal working state in response to the second interrupt signal.

2. The voice wakeup detecting device as claimed in claim 1, wherein if the digital microphone confirms that the digital voice signal contains the subword according to subword model parameters stored in a first memory, the digital microphone asserts the first interrupt signal and outputs the digital voice signal to the speech recognition processor.

3. The voice wakeup detecting device as claimed in claim 1, wherein if the speech recognition processor confirms that the digital voice signal does not contain the keyword, the speech recognition processor does not assert the second interrupt signal, the speech recognition processor is not powered and the main processor is in the sleep state.

4. The voice wakeup detecting device as claimed in claim 3, wherein the digital microphone comprises:
an internal oscillator for generating a clock signal;
an analog-to-digital converter for converting an analog speech sound into a digital voice signal;
a subword judging circuit for judging whether the digital voice signal contains the subword according to the subword model parameters, wherein if the subword judging circuit confirms that the digital voice signal contains the subword, the subword judging circuit generates the first interrupt signal;
a first-in-first-out buffer, wherein when the first interrupt signal is generated, the digital voice signal is temporarily stored in the first-in-first-out buffer; and
a first interface control module outputting the first interrupt signal and the digital voice signal to the speech recognition processor,
wherein the analog-to-digital converter, the subword judging circuit, the first-in-first-out buffer and the first interface control module are operated according to the clock signal.

5. The voice wakeup detecting device as claimed in claim 4, wherein the subword judging circuit comprises:
a feature extractor for extracting information of the digital voice signal and generating a normalized voice feature signal; and
a matching circuit for judging whether the normalized voice feature signal contains the subword according to the subword model parameters, wherein if the matching circuit confirms that the normalized voice feature signal contains the subword, the matching circuit generates the first interrupt signal.

6. The voice wakeup detecting device as claimed in claim 5, wherein the feature extractor comprises:
a spectral analyzer for extracting the information of the digital voice signal and generating plural vectors, wherein the plural vectors constitutes a voice feature signal; and
a feature normalizer for normalizing the vectors of the voice feature signal, thereby generating the normalized voice feature signal.

7. The voice wakeup detecting device as claimed in claim 4, wherein the speech recognition processor and the main processor are integrated into an application processor, and the application processor comprises:
a second interface control module receiving the first interrupt signal and the digital voice signal from the first interface control module;
a user-training module, wherein when the electronic product is in the normal working state, the user-training module creates the keyword model parameters and the subword model parameters according to the digital voice signal;
a keyword recognition module for judging whether the digital voice signal contains the keyword according to the keyword model parameters, wherein if the keyword recognition module confirms that the digital voice signal contains the keyword, the electronic product is waked up from the sleep state to the normal working state under control of the keyword recognition module; and
a digital microphone activation control module for selectively enabling or disabling the digital microphone.

8. The voice wakeup detecting device as claimed in claim 4, wherein the subword judging circuit comprises a sub-band voice activity detection stage and a subword detection stage; wherein the subword detection stage is triggered by the sub-band voice activity detection stage when the digital voice signal contains a voice.

9. The voice wakeup detecting device as claimed in claim 8, wherein the sub-band voice activity detection stage detects the digital voice signal according to dynamically updated noise and speech levels.

10. The voice wakeup detecting device as claimed in claim 8, wherein the subword detection stage compares calculated time and frequency information with dynamically updated time and frequency thresholds.

11. A digital microphone for an electronic product, the digital microphone connected to a speech recognition processor and a main processor of the electronic produce, and the digital microphone comprising:
an internal oscillator for generating a clock signal;
an analog-to-digital converter for converting an analog speech sound into a digital voice signal; and
a subword judging circuit for judging whether the digital voice signal contains a subword according to a plurality of subword model parameters;
wherein if the subword judging circuit confirms that the digital voice signal contains the subword, the speech recognition processor is powered and is notified to recognize the digital voice signal; and
wherein the speech recognition processor selectively notifies the main processor by judging whether the digital voice signal contains a keyword, wherein if the speech recognition processor confirms that the digital voice signal contains the keyword, the main processor is notified to wake up from the sleep state to a normal working state.

12. The digital microphone as claimed in claim 11, wherein if the subword judging circuit confirms that the digital voice signal contains the subword, the subword judging circuit asserts a first interrupt signal to the speech recognition processor.

13. The digital microphone as claimed in claim 12, further comprising:
a first-in-first-out buffer, wherein when the first interrupt signal is asserted, the digital voice signal is temporarily stored in the first-in-first-out buffer; and
a first interface control module outputting the first interrupt signal and the digital voice signal to the speech recognition processor of the electronic product, wherein the speech recognition processor is powered and enabled in response to the first interrupt signal;
wherein the analog-to-digital converter, the subword judging circuit, the first-in-first-out buffer and the first interface control module are operated according to the clock signal.

14. The digital microphone as claimed in claim 12, wherein the subword judging circuit comprises:
- a feature extractor for extracting information of the digital voice signal and generating a normalized voice feature signal; and
- a matching circuit for judging whether the normalized voice feature signal contains the subword according to the subword model parameters, wherein if the matching circuit confirms that the normalized voice feature signal contains the subword, the matching circuit generates the first interrupt signal.

15. The digital microphone as claimed in claim 14, wherein the feature extractor comprises:
- a spectral analyzer for extracting the information of the digital voice signal and generating plural vectors, wherein the plural vectors constitutes a voice feature signal; and
- a feature normalizer for normalizing the vectors of the voice feature signal, thereby generating the normalized voice feature signal.

16. The digital microphone as claimed in claim 11, wherein the subword judging circuit comprises a sub-band voice activity detection stage and a subword detection stage; wherein the subword detection stage is triggered by the sub-band voice activity detection stage when the digital voice signal contains a voice.

17. The digital microphone as claimed in claim 16, wherein the sub-band voice activity detection stage detects the digital voice signal according to dynamically updated noise and speech levels.

18. The digital microphone as claimed in claim 16, wherein the subword detection stage compare calculated time and frequency information with dynamically updated time and frequency thresholds.

19. A voice wakeup detecting method for an electronic product, the voice wakeup detecting method comprising steps of:
- when the electronic product is in a sleep state, allowing a digital microphone to generate a digital voice signal;
- if the digital voice signal contains a voice of a subword according to a plurality of subword model parameters confirmed by the digital microphone, asserting a first interrupt signal to the speech recognition processor and providing power to enable a speech recognition processor to recognize the digital voice signal according to a keyword model parameters; and
- if the digital voice signal contains a voice of a keyword confirmed by the speech recognition processor, asserting a second interrupt signal to wake up and providing power to enable a main processor of the electronic product from the sleep state to a normal working state.

20. The voice wakeup detecting method as claimed in claim 19, wherein the digital microphone recognizes the digital voice signal according to subword model parameters in the sleep state.

21. The voice wakeup detecting method as claimed in claim 20, wherein the speech recognition processor recognizes the digital voice signal according to keyword model parameters.

22. The voice wakeup detecting method as claimed in claim 21, wherein if the digital voice signal contains the voice of the subword, the digital microphone asserts the first interrupt signal to the speech recognition processor, wherein the speech recognition processor is powered and enabled in response to the first interrupt signal.

23. The voice wakeup detecting method as claimed in claim 21, wherein if the digital voice signal does not contain the voice of the subword, the digital microphone continuously recognizes the digital voice signal according to the subword model parameters.

24. The voice wakeup detecting method as claimed in claim 21, wherein after the digital microphone generates the digital voice signal, the digital microphone performs steps of:
- extracting information of the digital voice signal and generating a normalized voice feature signal; and
- judging whether the normalized voice feature signal contains the subword according to the subword model parameters.

25. The voice wakeup detecting method as claimed in claim 24, further comprising steps of:
- extracting the information of the voice signal and generating plural vectors, wherein the plural vectors constitutes a voice feature signal; and
- normalizing the vectors of the voice feature signal, thereby generating the normalized voice feature signal.

26. The voice wakeup detecting method as claimed in claim 21, wherein when the electronic product is in the normal working state and a model parameter estimation unit of the main processor receives the digital voice signal corresponding to the keyword from a user, the model parameter estimation unit creates the keyword model parameters and the subword model parameters.

* * * * *